United States Patent
Okazaki

(10) Patent No.: US 8,595,779 B2
(45) Date of Patent: Nov. 26, 2013

(54) BASE SERVER APPARATUS, COMMUNICATION METHOD, COMMUNICATION CONTROL PROGRAM, DISTRIBUTION SYSTEM, AND COMMUNICATION SYSTEM

(75) Inventor: Takumi Okazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 209 days.

(21) Appl. No.: 12/702,000

(22) Filed: Feb. 8, 2010

(65) Prior Publication Data

US 2010/0229209 A1 Sep. 9, 2010

(30) Foreign Application Priority Data

Mar. 3, 2009 (JP) .................................. 2009-049284

(51) Int. Cl.
  *H04N 7/173* (2011.01)
  *H04N 5/445* (2011.01)
  *H04N 5/765* (2006.01)

(52) U.S. Cl.
  USPC ................. 725/88; 725/58; 725/87; 725/126; 386/200

(58) Field of Classification Search
  None
  See application file for complete search history.

(56) References Cited

U.S. PATENT DOCUMENTS

| 7,020,081 | B1 | 3/2006 | Tani et al. | |
|---|---|---|---|---|
| 2003/0149988 | A1* | 8/2003 | Ellis et al. | 725/87 |
| 2006/0156344 | A1* | 7/2006 | Iwata et al. | 725/58 |
| 2007/0094697 | A1* | 4/2007 | Weigand | 725/126 |
| 2009/0187951 | A1* | 7/2009 | McCarthy et al. | 725/58 |
| 2012/0072956 | A1 | 3/2012 | Thomas et al. | |

FOREIGN PATENT DOCUMENTS

| JP | 2000031964 A | 1/2000 |
|---|---|---|
| JP | 3098491 B | 8/2000 |
| JP | 2003230123 A | 8/2003 |
| JP | 2003530033 A | 10/2003 |
| JP | 2004112167 A | 4/2004 |
| JP | 2005318250 A | 11/2005 |
| KR | 10-2007-0063692 A | 6/2007 |
| KR | 10-2007-0112747 A | 11/2007 |
| KR | 10-2008-0077248 A | 8/2008 |

OTHER PUBLICATIONS

Korean Office Action for KR10-2010-0018415 issued Jun. 27, 2011.
Japanese Office Action for JP2009-049284 mailed on Dec. 11, 2012.

* cited by examiner

*Primary Examiner* — Oschta Montoya

(57) ABSTRACT

A base server apparatus of the present invention includes a data distribution control unit for receiving a pause request signal that requests to pause playing the data from a terminal, and a data accumulation unit for starting to record data transmitted from a distribution center after receiving the pause request signal. The data distribution control unit includes a distribution unit that transfers the data transmitted from the distribution center to the terminal not requesting to pause playing the data, and if a resume request signal requesting to resume playing the data is received from the terminal requesting to pause playing the data, the distribution unit distributes the data recorded in the data accumulation unit to the terminal.

4 Claims, 5 Drawing Sheets

| RECORDED DATA | TERMINAL LIST |
|---|---|
| DATA#1 | TERMINAL#1 |
| DATA#2 | TERMINAL#2, TERMINAL#3 |

Fig. 4 and claims the benefit of
BASE SERVER APPARATUS, COMMUNICATION METHOD, COMMUNICATION CONTROL PROGRAM, DISTRIBUTION SYSTEM, AND COMMUNICATION SYSTEM

INCORPORATION BY REFERENCE

This application is based upon and claims the benefit of priority from Japanese patent application No. 2009-049284, filed on Mar. 3, 2009, the disclosure of which is incorporated herein in its entirety by reference.

BACKGROUND OF THE INVENTION

1. Field of the Invention

The present invention relates to a base server apparatus, a communication method, a storage medium that stores a communication control program, a distribution system, and a communication system, and particularly to a base server, a communication method, a communication control program product, a distribution system, and a communication system for distributing data to multiple terminals.

2. Description of Related Art

A video distribution service like a video streaming distribution continues to grow. As the next service after the IP (internet Protocol) broadcasting, the time-shifted service (which enables to pause live video and then view from the timing at the time of the pause) is attracting attention. If there is only IP broadcasting that uses multicast, the load of the network will not increase along with an increase in the number of viewers. However, in order to implement the time-shifted service that attracting attention, a unicast communication is required for each viewing terminal requesting the time-shifted service. This causes to generate the load of the network according to the number of the viewing terminals. Therefore, a structure is required beyond the existing framework which has been providing the service in a single base.

Japanese Patent No. 3098491 discloses a live playing technique that accumulates video data in a storage device such as a hard disk and at the same time, distributes the latest video to a video player apparatus as quickly as possible.

Japanese Unexamined Patent Application Publication No. 2003-230123 discloses a technique attempting to distribute the load at the time of starting to view a live program, and even if a viewer wishes to view from the middle the live program, the technique enables the viewer to view the program from the beginning using the time-shifted technology.

Japanese Unexamined Patent Application Publication No. 2004-112167 discloses a technique to record distributed live video and view the recorded video backward in time.

Japanese Unexamined Patent Application Publication No. 2005-318250 discloses a technique to start recording live content at the time of starting to distribute the live content, and manage information including a viewer's ID and stopped time, so that even after a viewer stops to view the live content, the viewer can view the video after being stopped if the viewer wishes to resume viewing the video.

SUMMARY

In the techniques disclosed by the above related arts, if a user viewing live content pauses to view the live content, the live content data is saved to the information terminal of the user. Moreover, if the user wishes to resume viewing the live content, the data in the information terminal of the user is played. However, in light of the content right, in the service that will not allow users to view content data by recording to the viewing terminal, the users cannot use the time-shifted service.

Moreover, if the content data is not saved to the information terminal of the user but saved to the distribution side of the content data, the distribution side of the content data needs to store all the data to be distributed for the users who wish the time-shifted service. Therefore, the present inventor has found a problem that there will be massive cumulative amount of the content data.

The purpose of the present invention is to resolve such problem and provide a base server apparatus, a communication method, a communication control program product, a distribution system, and a communication system that enables to reduce the data accumulated in the distribution bases of the content data.

In a first exemplary aspect of the invention, a base server apparatus, that relays data to be transmitted to a plurality of terminals from a distribution center and is disposed to a plurality of bases, includes a data distribution control unit that receives a pause request signal from the terminals, where the pause request signal requests to pause playing the data, and a data accumulation unit that starts recording the data transmitted from the distribution center after receiving the pause request signal. The data distribution control unit includes a distribution unit that transfers the data transmitted from the distribution center to the terminal not requesting to pause playing the data, and if a resume request signal for requesting to resume playing the data is received from the terminal requesting to pause playing the data, distributes the data recorded in the data accumulation unit.

In a second exemplary aspect, a communication method for relaying data to a plurality of terminals from a distribution center includes receiving a pause request signal requesting to pause playing the data from the terminal, starting to record the data transmitted from the distribution center after receiving the pause request signal, and transferring the data transmitted from the distribution to the terminal not requesting to pause playing the data, and if a resume request signal requesting to resume playing the data is received from the terminal requesting to pause playing the data, distributing the recorded data to the terminal.

In a third exemplary aspect, a storage medium that stores a communication control program for causing a control computer of a base server apparatus. The communication control program includes receiving a pause request signal requesting to pause playing data from a terminal, indicating to start recording the data transmitted from a distribution center after receiving the pause request signal, and transferring the data transmitted from the distribution to the terminal not requesting to pause playing the data, and if a resume request signal requesting to resume playing the data is received from the terminal requesting to pause playing the data, distributing the recorded data to the terminal.

In a fourth exemplary aspect, a distribution system that transmits data to a plurality of terminals at predetermined time includes receiving a pause request signal requesting to pause playing the data from the terminal, starting to record the data after receiving the pause request signal, and transmitting the data to the terminal not requesting to pause playing the data, and if a resume request signal requesting to resume playing the data is received from the terminal requesting to pause playing the data, distributing the recorded data to the terminal.

In a fifth exemplary aspect, a communication system includes a distribution center that distributes data to a plurality of terminals and a base server apparatus that relays data to be transmitted to the plurality of terminals from the distribution center and is disposed to a plurality of bases. The distribution center transmits the data addressed to the plurality of terminals to the base server apparatus, and the server apparatus receives a pause request signal that requests to pause playing the data from the terminal, starts recording the data transmitted from the distribution center after receiving the pause request signal, and transfers the data transmitted from the distribution center to the terminal not requesting to pause playing the data, and if a resume request signal requesting to resume playing the data is received from the terminal requesting to pause playing the data, distributes the recorded data to the terminal.

The present invention provides a base server apparatus, a communication method, a communication control program product, a distribution system, and a communication system that attempt to reduce data accumulated in the distribution base of the content data.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 4 is an information table held by the base server apparatus according to the first exemplary embodiment;

DESCRIPTION OF THE EXEMPLARY EMBODIMENTS

Figure 1:
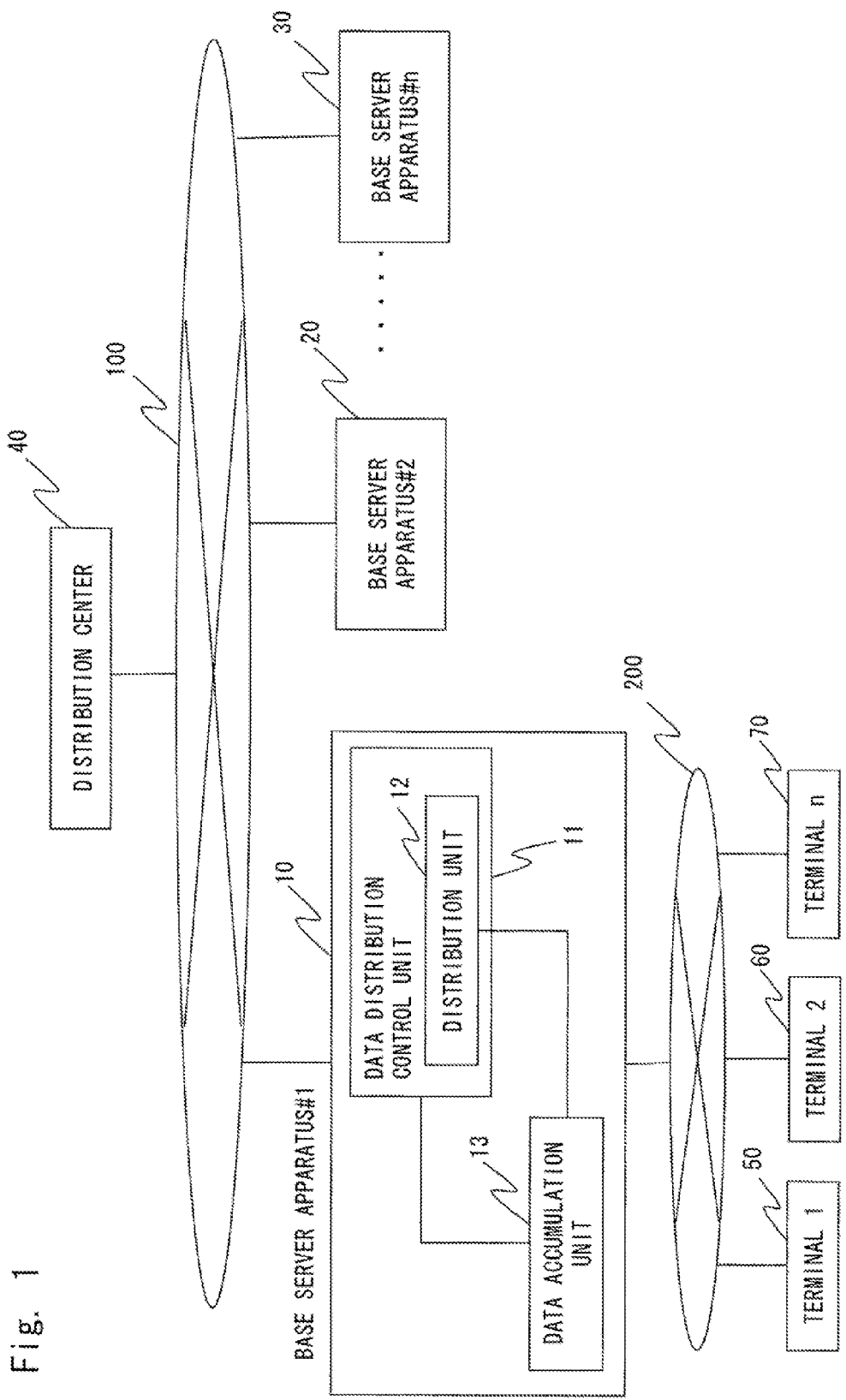
FIG. 1 is a block diagram of a base server apparatus according to a first exemplary embodiment.

Hereafter, exemplary embodiments of the invention are described with reference to the drawings. For clarity of explanation, the following description and drawings are omitted and simplified as appropriate. Each component described in the drawings as functional blocks for carrying out various processes can be composed of CPU, memory, and other circuits in terms of hardware. In terms of software, the components can be realized by programs loaded to a memory. Therefore, those skilled in the art will understand that these functional blocks can be achieved by various forms such as only by hardware, software, or combination thereof, and it is not limited to any of them.

First Exemplary Embodiment

An example of the configuration of a base server apparatus according to an exemplary embodiment of the present invention is described hereinafter with reference to the FIG. 1. A base server apparatus 10 relays data from a distribution center 40 connected via a center network 100 to be transmitted to terminals 50, 60 and 70 via a base network 200. In a similar way, base server apparatuses 20 and 30 relay data to be transmitted to terminals from the distribution center 40. For example, the distribution center 40 transmits the data to the terminals 50, 60, and 70 in a multicast communication. In this case, the distribution center 40, the terminals 50, 60, and 70 belong to the same multicast group.

The base server apparatus 10 is provided with a data distribution control unit 11, a distribution unit 12, and a data accumulation unit 13. The data transmitted from the distribution center 40 is transmitted to each of the terminals 50, 60, and 70 via the distribution unit 12 that composes the data distribution control unit 11. The data transmitted from the distribution center 40 includes video data, music data, or the like. Further, the video data includes live video distributed in real time.

The data distribution control unit 11 is composed of a control computer (for example, a microprocessor unit) that operates according to a communication control program. The data distribution control unit 11 receives a pause request signal for requesting to pause playing the data from the terminal 50 which has received the data from the distribution center 40. In response to the pause request signal, the data distribution control unit 11 outputs a signal indicating to start recording the data to the data accumulation unit 13.

After the data distribution control unit 11 has received the pause request signal, the data accumulation unit 13, which has obtained the signal indicating to start recording the data, starts recording the data received from the distribution center 40. The base server apparatus 10 may be provided with multiple data distribution control units 11. In that case, the data accumulation unit 13 is shared by the multiple data distribution units 11. Further, when selecting the data distribution control unit 11, the base server apparatus 10 may select an appropriate data distribution control unit 11 using a known load distribution method such as round-robin.

The distribution unit 12 transfers the data transmitted from the distribution center 40 and distributes the data recorded in the data accumulation unit 13 to the terminals 50, 60, and 70. The distribution unit 12 transfers the data transmitted from the distribution center 40 to the terminals 60 and 70 that have not requested to pause playing the data. At the same time, if the distribution unit 12 received a resume request signal for requesting to resume playing the data from the terminal 50 which is requesting to pause playing the data, the distribution unit 12 distributes the data recorded in the data accumulation unit 13 to the terminal 50.

Figure 2:
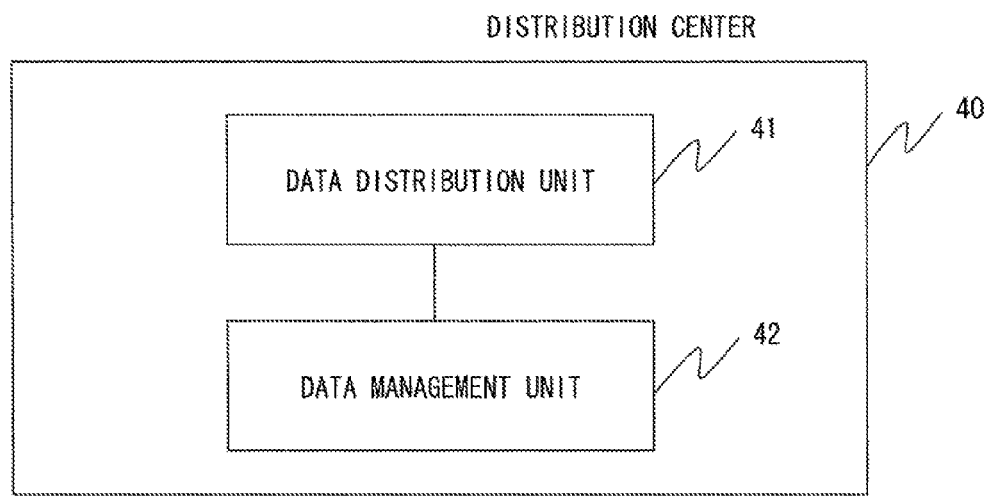
FIG. 2 is a block diagram of a distribution center according to the first exemplary embodiment.

Next, an example of the configuration of the distribution center according to the first exemplary embodiment of the present invention is described with reference to FIG. 2. The distribution center 40 is provided with a data distribution unit 41 and a data management unit 42. The data distribution unit 41 transmits the data to be transmitted to the terminals to the base server apparatuses 10, 20, and 30 via the center network 100.

The distribution center 40 may be provided with multiple data distribution units depending on the contents of the data to transmit. Further, the data distribution unit 41 may be provided to an apparatus that is disposed to a different place from the distribution center 40. For example, the distribution center 40 corresponds to a broadcast station which distributes video across the country. In a case of a live telecast of a sport event conducted in a different place from the broadcast station, the data distribution unit is provided to an apparatus that is disposed to the sport event site. In this case, the data distribution unit 41 provided to the distribution center 40 receives data from the apparatus disposed to the different place. That is, the broadcast station receives broadcast data from the sport event site. The data distribution unit 41 provided to the distribution center 40 transmits the received data to the base server apparatuses 10, 20, and 30 via the center network 100. If the data distribution unit provided to an apparatus disposed to a different place is connected to the center network 100 and capable of handling multicast communications, the data distribution unit may directly transmit data to the base server apparatuses 10, 20 and 30 instead of transmitting data to the distribution center 40.

The data management unit 42 manages access information necessary to receive the data to be distributed. The access information is the information necessary for terminals to decode data transmitted by multicast. For example, the access information includes a multicast address, a port number or the like.

Figure 3:
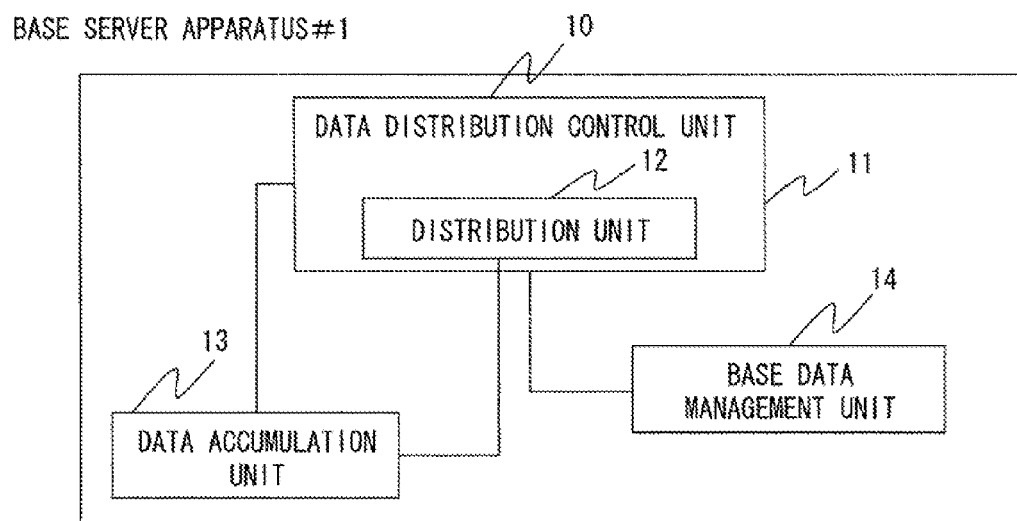
FIG. 3 is a block diagram of a base server apparatus according to the first exemplary embodiment.

Next, an example of the configuration of the base server apparatus according to an exemplary embodiment of the present invention is described in detail with reference to FIG. 3. The base server apparatus 10 is provided with a base data management unit 14. The other configuration is same as FIG. 1, thus the explanation is omitted. The data distribution control unit 11 obtains terminal information using the time-shifted service from the base data management unit 14, and distributes the data recorded in the data accumulation unit 13 to the terminals.

The base data management unit 14 manages that which terminal is playing data using the time-shifted service (hereinafter referred to as a time-shifted viewing). For example, as illustrated in the management table of FIG. 4, the data recorded in the data accumulation unit 13 and, the terminal that is showing in a time-shifted viewing or the terminal requesting to pause playing the data are associated to be managed. The data #1 is viewed in a time-shifted viewing by the terminal #1, otherwise the terminal #1 requests to pause playing the data #1. The data #2 is viewed in a time-shifted viewing by the terminals #1 and #3, otherwise the terminals #2 and #3 request to pause playing the data #2.

The base data management unit 14 synchronizes with the data management unit 42 of the distribution center 40, and holds the access information necessary for playing the data. This is because that at the time of distributing the data to the terminal that shows in a time-shifted viewing from the base server apparatus 10, the terminal needs to synchronize with the access information in order to demodulate the distributed data by the terminal. Another reason is that if the terminal queries for the access information necessary for a multicast communication, the base server apparatus can notify the access information to the terminal without querying to the distribution center 40.

Further, the distribution center 40 may be provided with the function of the base server apparatus. Specifically, the distribution center 40 may be provided with the data distribution control unit 12 and the data accumulation unit 13 to perform the process concerning the time-shifted viewing.

Figure 5:
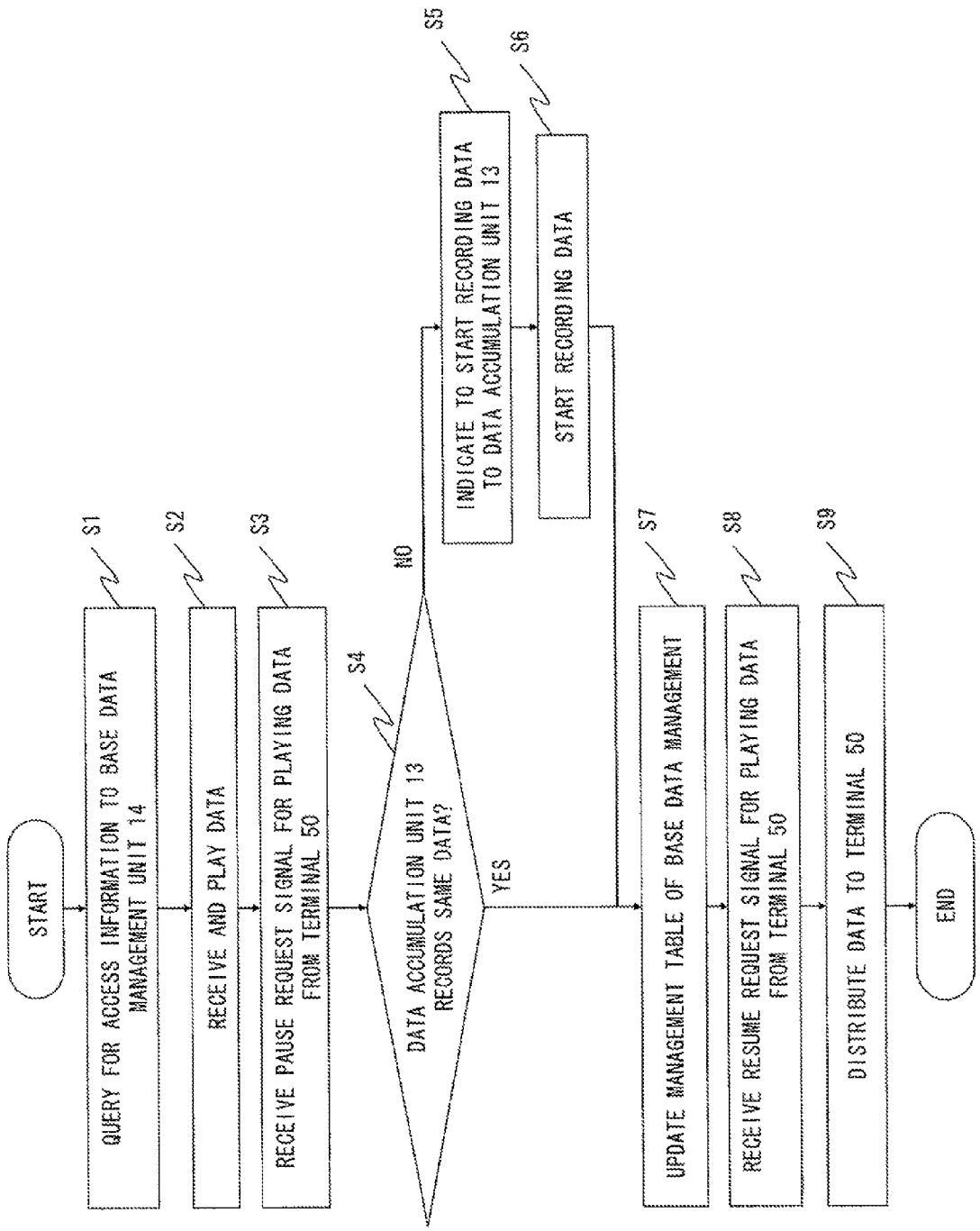
FIG. 5 is a flowchart according to the first exemplary embodiment.

Next, the flow of the processes according to the first exemplary embodiment of the present invention is described with reference to FIG. 5. The terminal 50 queries for the access information to the base data management unit 14 (S1). The terminal 50 queries for the access information using RTSP URI (Real Time Streaming Protocol Uniform Resource Identifier), for example. The access information is the information necessary to decode data distributed by multicast.

Next, the terminal 50 receives a multicast distribution of the data distribution unit 41 to play the data (S2). If some terminals among the multiple terminals are not capable of handling multicast communications, the base server apparatus 10, which has received the data in a multicast communication from the distribution center 40, may transmit data to the terminal in a unicast communication.

Next, the terminal 50 transmits a pause request of playing the data to the data distribution control unit 11 for the data received from the distribution center 40 (S3). The data distribution control unit 11 confirms to the data management unit 14, if the same data as the data requested to pause by the terminal 50 is saved to the data accumulation unit 13 (S4). If the same data is not saved, the data distribution control unit 11 indicates to record the distribution data to the data accumulation unit 13 (S5). The data accumulation unit 13, which has been indicated to record the distribution data by the data distribution control unit, records the distribution data (S6).

If the same data as the data requested to pause by the terminal 50 is not saved to the data accumulation unit 13 and the distribution data is recorded in the data accumulation unit 13, the data management unit 14 adds to the management table of FIG. 4 that the terminal 50 is requesting a time-shifted viewing for the corresponding data.

Next, the data distribution control unit 11 receives a resume request signal for requesting to resume playing the data from the terminal 50 (S8). The distribution unit 12 distributes the data recorded in the data accumulation unit 13 from the point paused by the terminal 50 to the terminal 50 in a unicast communication (S9).

As explained so far, the base server apparatus according to the first exemplary embodiment of the present invention enables to record only the data after being paused by the terminal instead of recording all the data distributed by the distribution center and thereby reducing the data capacity to record.

Moreover, if multiple terminals request to view the same data in a time-shifted viewing, the data accumulation unit 13 records the data only once to share the data among the multiple terminals. This further reduces the data capacity.

Furthermore, as the multiple base server apparatuses have the data accumulation units, it is possible to view in a time-shifted viewing without an additional communication to the distribution center at the time of requesting a time-shifted viewing from the terminals. Then, the distribution center 40 does not need to perform processes for a unicast communication for the number of terminals requesting the time-shifted viewing. This reduces the process load and also distributes the load of the distribution center 40.

Further, as the base data management unit 14 of the base server apparatus synchronizes with the data management unit 42 of the distribution center 40, a time-shifted viewing can be achieved only by a closed communication between the terminals and the base server apparatus. This enables to reduce the communication capacity between the distribution center 40 and the base server apparatus 10.

Even if there is a failure in one of the base server apparatuses, the data can continue to be distributed in other base server apparatuses, and thereby reducing the extent of the impact in the service.

Second Exemplary Embodiment

Figure 6:
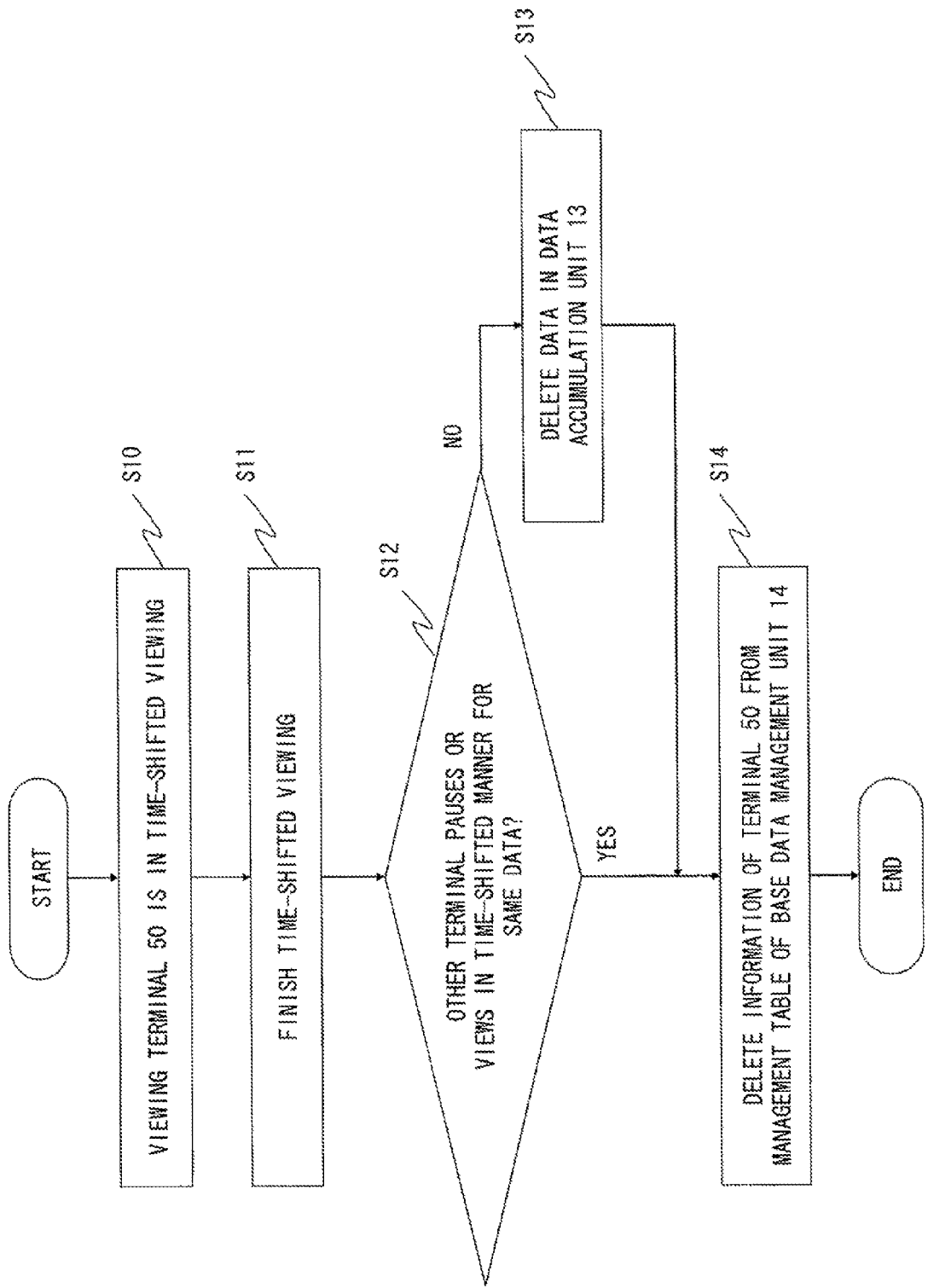
FIG. 6 is a flowchart according to a second exemplary embodiment.

A flow of the processes according to a second exemplary embodiment of the present invention is described with reference to FIG. 6. Note that as the configurations of the base server apparatus and the distribution center according to the second exemplary embodiment are same as the first exemplary embodiment, the explanation is omitted.

The terminal 50 receives data recorded in the data accumulation unit 13 from the distribution unit 12, so as to view the data in a time-shifted viewing (S10). Next, at the time of completing the time-shifted viewing, the terminal 50 notifies a completion of the time-shifted viewing to the data distribution unit 11 (S11). The terminal 50 may complete the time-shifted viewing when completing to play all the data accumulated in the data accumulation unit 13, or the terminal 50 may complete the time-shifted viewing before playing all the data accumulated in the data accumulation unit 13.

Next, the data distribution control unit 11, which has received the completion notice of the time-shifted viewing, confirms to the base data management unit 14 whether or not other terminals are viewing the same data in a time-shifted viewing (S12).

If other terminals are not requesting to pause or viewing in a time-shifted viewing for the same data, the base data management unit 14 deletes the data from the data accumulation unit 13 (S13). If other terminals are requesting to pause or viewing in a time-shifted viewing for the same data and the process of S13 is performed, the information in the terminal 50 regarding the corresponding data is deleted from the management table, which is managed by the base data management unit 13 (S14).

As described so far, if there is no terminal that requests to pause or views in a time-shifted viewing for the data accumulated in the data accumulation unit 13, the second exemplary embodiment of the present invention enables to reduce the saved data capacity in the base server apparatus 10 by deleting the data from the data accumulation unit 13.

The above explanation only describes the exemplary embodiments of the present invention, and the present invention is not limited to the exemplary embodiments. Further, those skilled in the art will be able to easily modify, add, and convert the components of the above exemplary embodiments in the sprit and the scope of the present invention. Furthermore, in the above exemplary embodiments, the present invention is described to be composed of hardware, however the present invention is not limited to this. The present invention may also be realized by the computer program to execute any process on a CPU (Central Processing Unit). In such case, the computer program can be recorded on a recording media or may be transmitted via other communication media such as the Internet. Moreover, the recording media includes a flexible disk, hard disk, a magnetic disk, a magneto-optical disc, a CD-ROM, a DVD, a ROM cartridge, a RAM memory cartridge with a battery backup, a flash memory cartridge, and a nonvolatile RAM cartridge, for example. The communication media includes wire communication media such as telephone line and wireless communication media such as a microwave link, for example.

Each of the above-described embodiments can be combined as desirable by one of ordinary skill in the art.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A base server apparatus that relays data to be transmitted to a plurality of terminals from a distribution center and is disposed to a plurality of bases, the base server apparatus comprising:
    a data distribution control unit that controls to distribute the data from the distribution center to the terminals;
    a data accumulation unit that records the data transmitted from the distribution center in response to a request signal from the data distribution control unit;
    a management table that associates the data recorded in the data accumulation unit and the terminal that is showing in a time-shifted viewing or the terminal requesting to pause playing the data, wherein when the data distribution control unit receives a pause request signal for requesting to pause playing the data from the terminal, the data distribution control unit:
        outputs the request signal for requesting to start recording the data to the data accumulation unit in response to the pause request signal from the terminals when the same data as the data requested to pause by the terminal is not recorded to the data accumulation unit by request from other terminals,
        distributes the data recorded in the data accumulation unit in response to a resume request signal for requesting to resume playing the data from the terminal requesting to pause playing the data, and
        deletes the data recorded in the data accumulation unit with a completion of distributing the data to the terminal that requested to resume playing the data when there is no terminal that pauses playing the data or receives the data.

2. A communication method for relaying data to a plurality of terminals from a distribution center, the method comprising:
    controlling, by a data distribution control unit, distribution of data from the distribution center to the terminals;
    recording, by a data accumulation unit, the data transmitted from the distribution center in response to a request signal from the data distribution control unit;
    associating, by a management table, the data recorded in the data accumulation unit and the terminal that is showing in a time-shifted viewing or the terminal requesting to pause playing the data;
    in response to the data distribution unit receiving a pause request signal for requesting to pause playing the data from the terminal,
        outputting, by the data distribution unit, the request signal for requesting to start recording the data to the data accumulation unit in response to the pause request signal from the terminals when the same data as the data requested to pause by the terminal is not recorded to the data accumulation unit by request from other terminals;
        distributing, by the data distribution unit, the data recorded in the data accumulation unit in response to a resume request signal for requesting to resume playing the data from the terminal requesting to pause playing the data; and
        deleting, by the data distribution control unit, the recorded data in the data accumulation unit with a completion of the distribution of the recorded data to the terminal that requested to resume playing the data when there is no terminal that pauses playing the data or receives the data.

3. A non-transitory computer readable medium that stores a communication control program for causing a control computer of a base server apparatus to execute:
    controlling, by a data distribution control unit, distribution of data from the distribution center to the terminals;
    recording, by a data accumulation unit, the data transmitted from the distribution center in response to a request signal from the data distribution control unit;
    associating, by a management table, the data recorded in the data accumulation unit and the terminal that is showing in a time-shifted viewing or the terminal requesting to pause playing the data;
    in response to the data distribution unit receiving a pause request signal for requesting to pause playing the data from the terminal, outputting, by the data distribution unit, the request signal for requesting to start recording the data to the data accumulation unit in response to the pause request signal from the terminals when the same data as the data requested to pause by the terminal is not recorded to the data accumulation unit by request from other terminals;

distributing, by the data distribution unit, the data recorded in the data accumulation unit in response to a resume request signal for requesting to resume playing the data from the terminal requesting to pause playing the data; and deleting, by the data distribution control unit, the recorded data in the data accumulation unit with a completion of the distribution of the recorded data to the terminal that requested to resume playing the data when there is no terminal that pauses playing the data or receives the data.

4. A communication system comprising:

a distribution center that distributes data to a plurality of terminals; and a base server apparatus that relays data to be transmitted to the plurality of terminals from the distribution center and is disposed to a plurality of bases, wherein the distribution center transmits the data addressed to the plurality of terminals to the base server apparatus, and the base server apparatus controls, by a data distribution control unit of the base server apparatus, distribution of data from the distribution center to the terminals;

records, by a data accumulation unit of the base server apparatus, the data transmitted from the distribution center in response to a request signal from the data distribution control unit;

associates, by a management table of the base server apparatus, the data recorded in the data accumulation unit and the terminal that is showing in a time-shifted viewing or the terminal data;

in response to the data distribution unit receiving a pause request signal for requesting to pause playing the data from the terminal, outputs, by the data distribution unit of the base server apparatus, the request signal for requesting to start recording the data to the data accumulation unit in response to the pause request signal from the terminals when the same data as the data requested to pause by the terminal is not recorded to the data accumulation unit by request from other terminals;

distributes, by the data distribution unit of the base server apparatus, the data recorded in the data accumulation unit in response to a resume request signal for requesting to resume playing the data from the terminal requesting to pause playing the data; and deletes, by the data distribution control unit of the base server apparatus, the recorded data in the data accumulation unit with a completion of the distribution of the recorded data to the terminal that requested to resume playing the data when there is no terminal that pauses playing the data or receives the data.

\* \* \* \* \*